(12) United States Patent
Godil et al.

(10) Patent No.: US 6,268,952 B1
(45) Date of Patent: Jul. 31, 2001

(54) MICROMECHANICAL LIGHT STEERING OPTICAL SWITCH

(75) Inventors: Asif A. Godil, Mountain View; David M. Bloom, Palo Alto, both of CA (US)

(73) Assignee: Lightconnect, Inc., Palo Alto, CA (US)

( * ) Notice: Subject to any disclaimer, the term of this patent is extended or adjusted under 35 U.S.C. 154(b) by 0 days.

(21) Appl. No.: 09/353,122

(22) Filed: Jul. 14, 1999

Related U.S. Application Data

(60) Provisional application No. 60/092,703, filed on Jul. 14, 1998.

(51) Int. Cl.[7] ................................................... G02B 26/08
(52) U.S. Cl. ........................... 359/291; 359/290; 359/247; 359/572
(58) Field of Search ................................. 359/291, 290, 359/247, 572, 254, 263, 295

(56) References Cited

U.S. PATENT DOCUMENTS

| | | | |
|---|---|---|---|
| 5,126,873 | * | 6/1992 | Ang ........................................ 359/217 |
| 5,130,830 | * | 7/1992 | Fukushima et al. ..................... 359/72 |
| 5,457,493 | * | 10/1995 | Leddy et al. ........................... 348/164 |
| 5,757,992 | * | 5/1998 | Miller ...................................... 385/24 |
| 5,949,570 | * | 9/1999 | Shiono et al. ......................... 359/291 |
| 6,055,090 | * | 4/2000 | Miles .................................... 359/291 |
| 6,094,294 | * | 9/2000 | Yokoyama et al. ................... 359/290 |
| 6,115,172 | * | 9/2000 | Jeong .................................... 359/292 |

* cited by examiner

*Primary Examiner*—Georgia Epps
*Assistant Examiner*—Tim Thompson
(74) *Attorney, Agent, or Firm*—Wilson Sonsini Goodrich & Rosati

(57) ABSTRACT

An optical switch uses a micromachined adjustable phase hologram device to route optical signals from an input fiber to selected output fibers is described. The adjustable phase hologram includes a large number of micromachined reflective ribbons which can be individually controlled and adjusted to produce a wide range of phase profiles to route the light beams from the input fiber. This optical switch is capable of dealing directly with optical signals, has fast switching speeds, is capable of routing WDM input signals, is polarization independent, is scalable to large switches, and avoids the complexity of other switches.

27 Claims, 12 Drawing Sheets

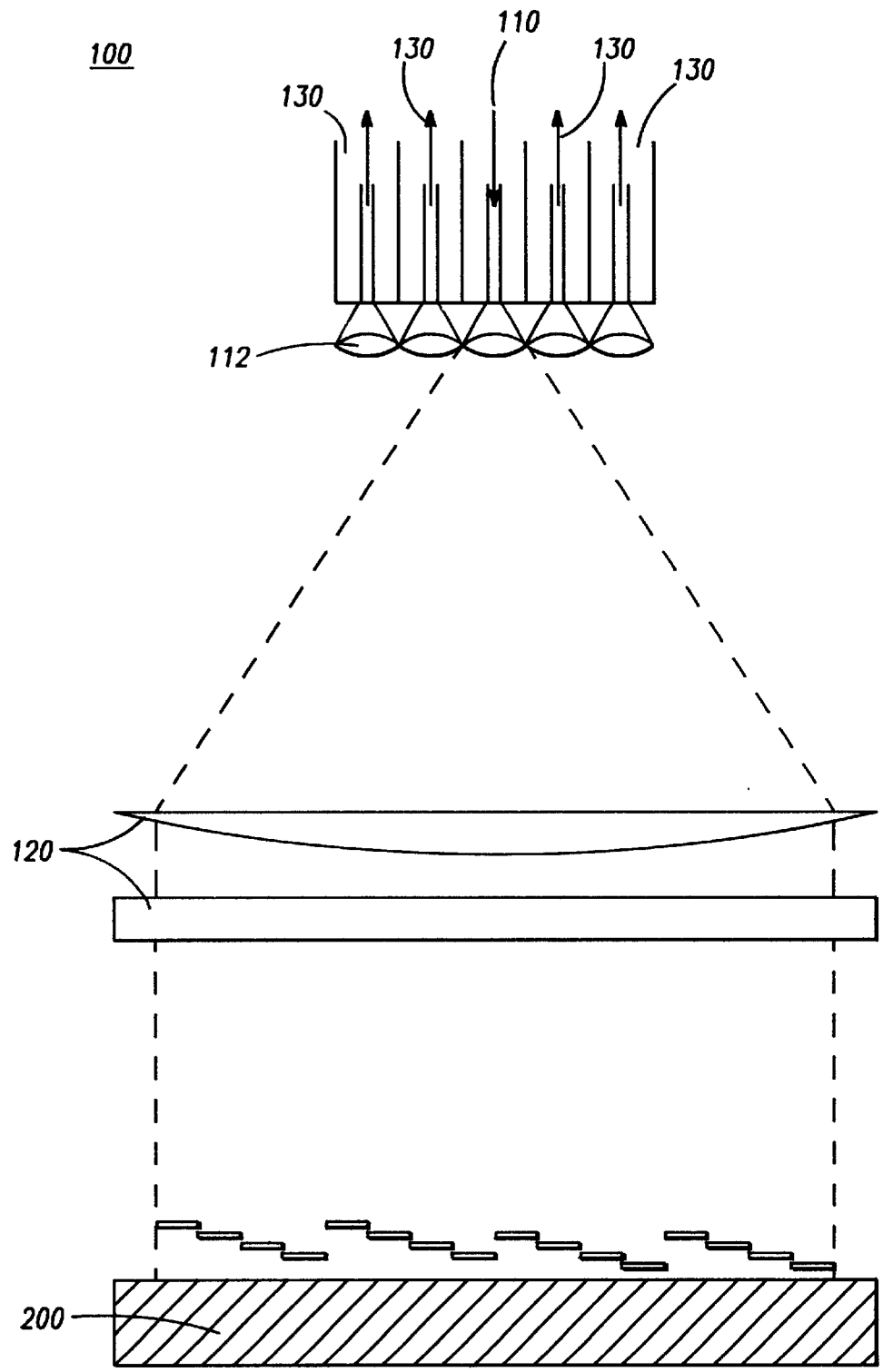
FIG. −1A

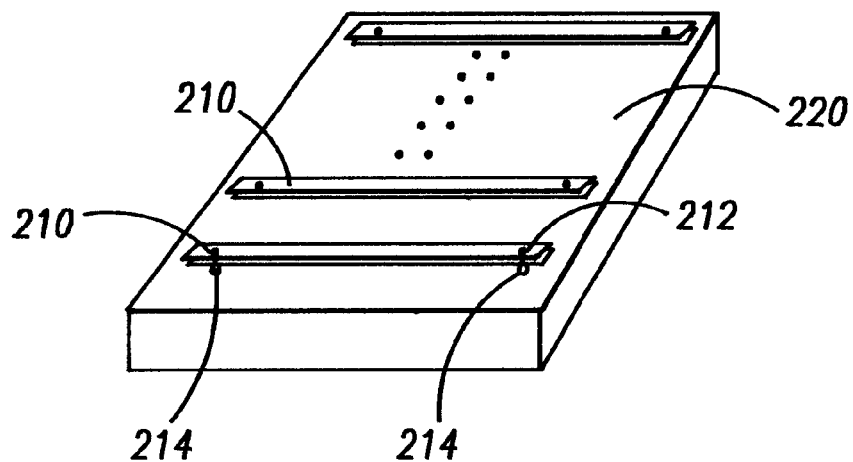
FIG.—2A
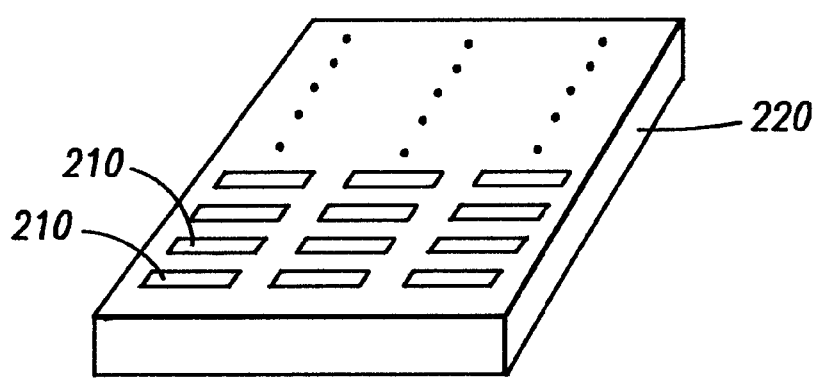
FIG.—2B

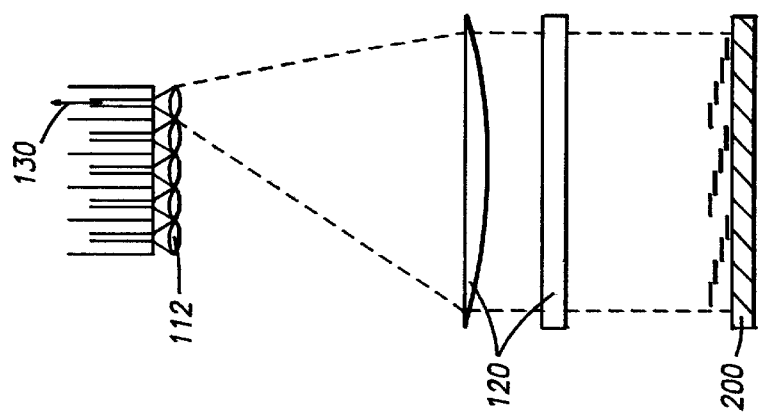
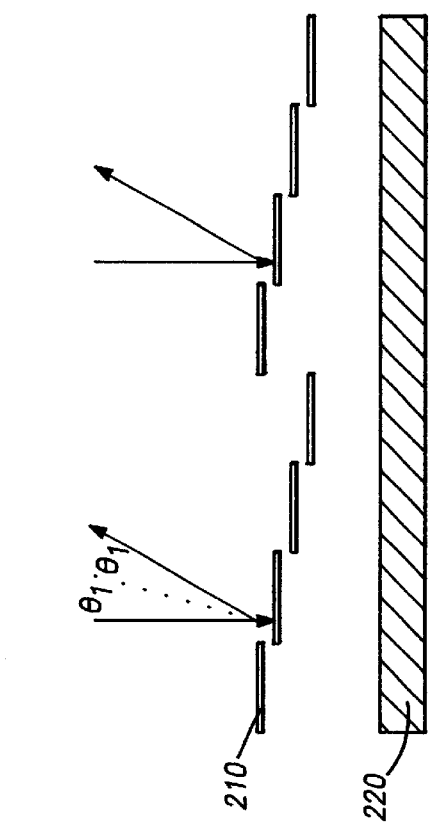
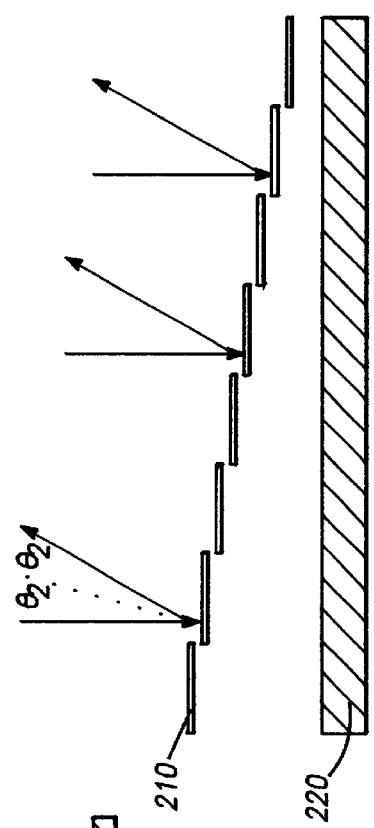
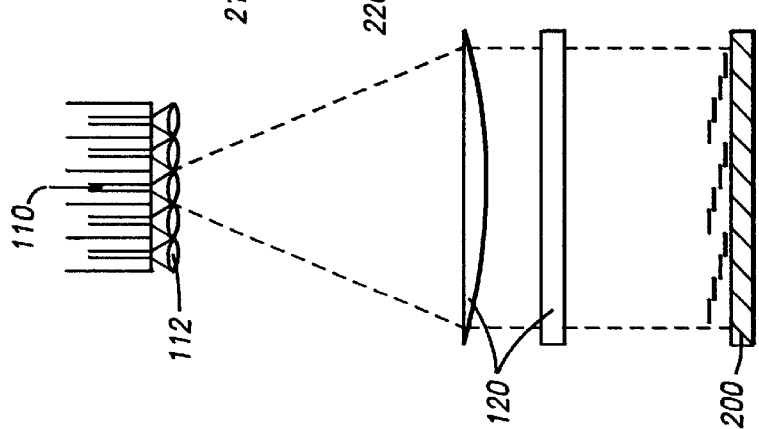
FIG.-3D
FIG.-3B
FIG.-3C
FIG.-3A

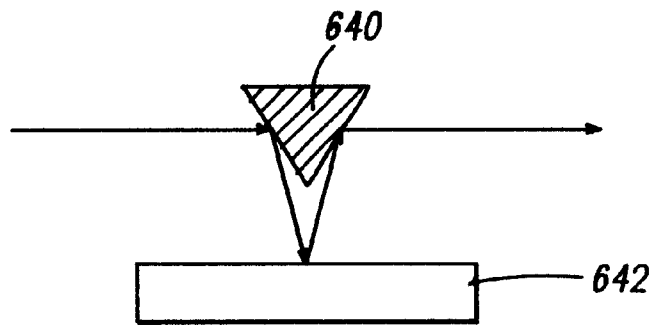
FIG.—6B
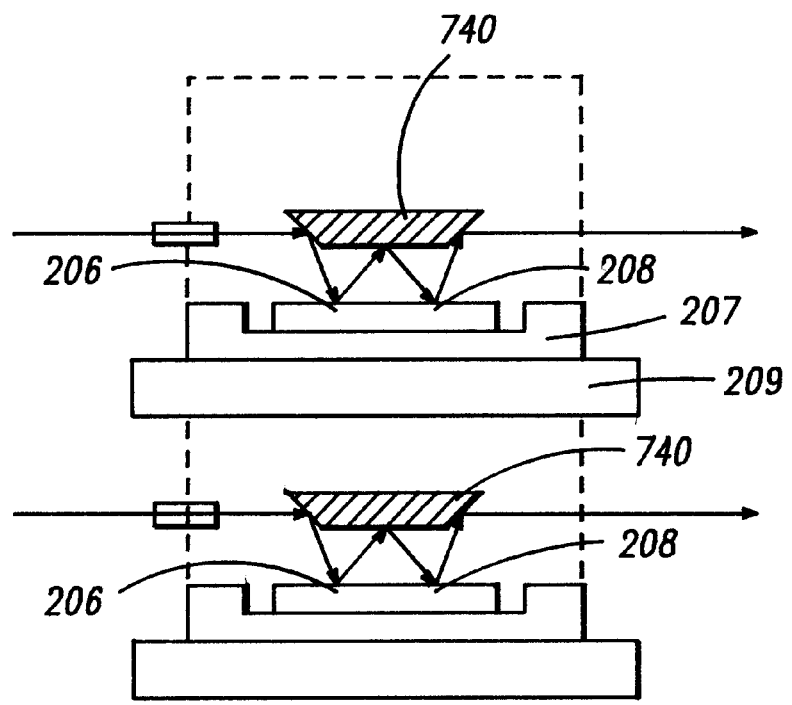
FIG.—7C

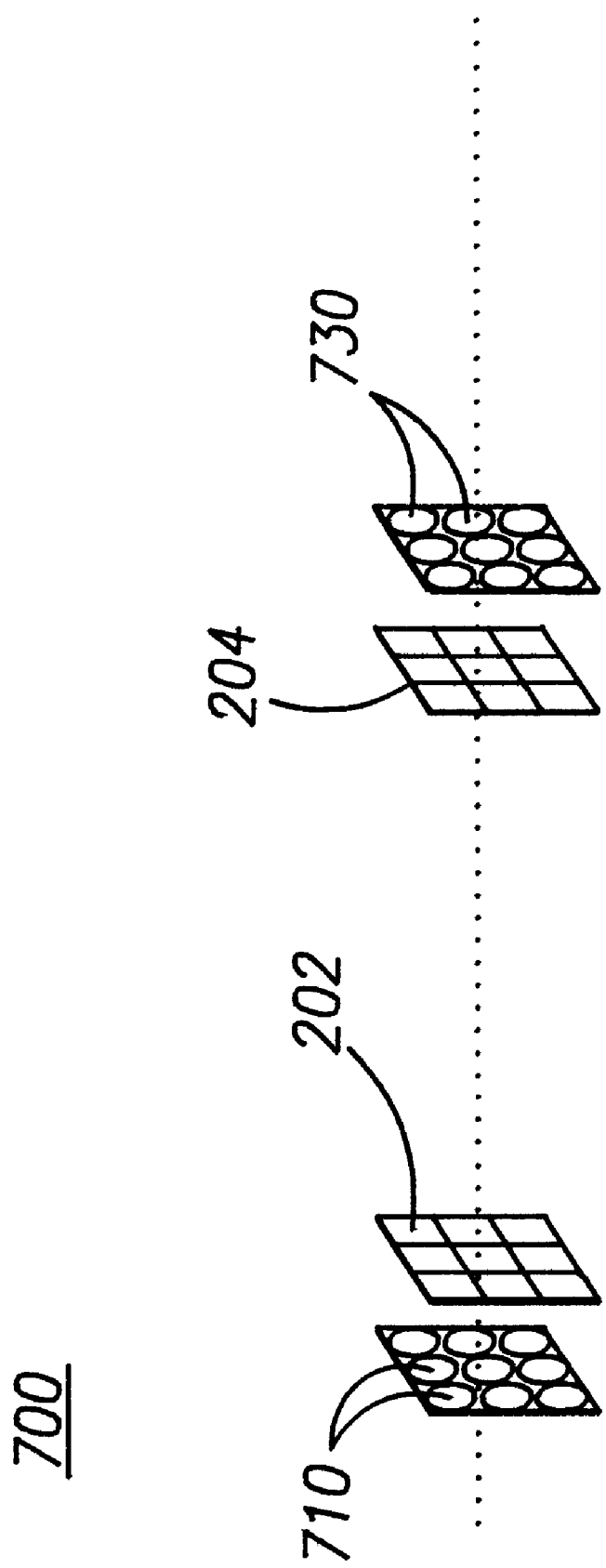
FIG. — 7A

MICROMECHANICAL LIGHT STEERING OPTICAL SWITCH

CROSS-REFERENCE TO RELATED APPLICATION

This application claims priority to and incorporates by reference the U.S. Provisional patent application entitled MICROMECHANICAL LIGHT STEERING OPTICAL SWITCH, Ser. No. 60/092,703, filed Jul. 14, 1998, and invented by Asif A. Godil and David M. Bloom.

BACKGROUND OF THE INVENTION

1. Field of the Invention

The present invention relates to an optical switch for use in optical networks. More particularly, the present invention relates to an optical switch incorporating a micromachined adjustable phase hologram capable of quickly and precisely redirecting a light beam.

2. Description of Related Art

Optical networks use light guided in optical fibers to transmit information in the digital domain for voice and data, and in the analog domain for cable television. The ability to transmit large bandwidths over long distances makes optic networks very attractive. WDM (wavelength division multiplexing) further expands the capacity and configurability of optical networks by sending information in one fiber over multiple wavelengths of light, where each wavelength is independently transmitted and detected. Many different switches are available for optical networks.

Manual patch panel products are similar to the manual telephone switchboards used before automatic telephone switches were invented. The drawbacks of patch cords include extremely slow switching speeds and the inability to provide dynamic and programmable routing for reconfiguring the network.

Electronic switches must first convert a light beam into an electrical signal before performing the switching or routing process. The electrical signal must then be converted back into a light signal. These conversion processes add additional costs for electronic converters on each side of the switch. These electrical switches are also necessarily complex, typically requiring a photosensor or other transducer to receive the light signal, as well as a laser diode to re-transmit the electrical signal back into a fiber optic line. The limitations of electronic switches in an optical network include the fact that they can be set up for only one format and their limited data rates.

1×3, 2×2, or 1×N optical switches, also known as bypass or A/B switches, allow an optical network manager to switch to an alternate fiber in the event of a fiber failure or other network problem. Most of these switches are unable to connect any more than two fibers to any other two fibers. One type of optical switch uses mirrors mounted on motors to create a 1×N switch, such as those offered by DiCon, which uses a motor-driven apparatus to position a fiber with a target fiber. DiCon claims that a user can build a 16×16 matrix by cascading 32 of their 1×16 switches. However, this configuration is cumbersome. Furthermore, these switches are very slow, and also have wear and service life issues.

Lithium niobate switches have switching times on the order of microseconds. However, one major drawback of the lithium niobate technology is that it will only support a limited matrix size, at the most eight input fibers by eight output fibers, which is too small for most applications. In addition, the insertion loss of lithium niobate technology is quite high, on the order of 8–12 dB, which means that up to 94 percent of the light is lost when passing through a lithium niobate switch. Lithium niobate switches also have inherently high crosstalk between channels. There are very specific wavelength requirements on the light passing through a lithium niobate switch, which means that WDM cannot be employed with lithium niobate switches. In addition, wavelength specific lasers are more expensive than standard lasers and are more difficult to use. Also, lithium niobate switches are not polarization independent.

Electronically controlled piezoelectric elements are used in optical switches, such as those available from Astarte Fiber Networks. The optical signal from the input fibers is focused into a collimated light beam through a lens. This beam is then automatically directed to the selected output fiber with the receiving lens focusing the light into the receiving fiber core. The light beams are routed using electronically-controlled piezoelectric elements. Signals are switched in approximately 150 milliseconds by changing the direction of the light beam from the input fiber to a different receiving output fiber.

Electro-optic polymer waveguide technology has been used by Lightwave Microsystems to make an aggregation of 2×2 cross-point switches based on planar waveguides to build optical switches in 1×4, 4×4, 1×8, and 8×8 configurations.

Micromirror devices such as those developed by Texas Instruments use a bed of microscopic tilting mirrors. They can also only resolve a few spots, and have switching speeds on the order of 20 $\mu$sec.

AT&T is proposing to use a N×N matrix of pop-up mirrors to build a N×N switch. These pop-up mirrors raise up into the path of the light beam to route it. Such a switch is likely to have reliability problems. Such a switch has a switching speed on the order of tens of milliseconds.

What is needed is an optical switch which deals directly with optical signals, has fast switching speeds, is capable of routing WDM input signals, is polarization independent, is scalable to large switches, and avoids the complexity of other switches.

SUMMARY OF THE INVENTION

The present invention is directed towards an optical switch, comprising an optical input fiber carrying a light beam, a plurality of optical output fibers, a lens capable of directing the light beam onto an adjustable phase hologram device having a plurality of ribbons. The ribbons are capable of moving independently when a voltage is applied to each ribbon, and can also redirect the light beam from the lens to a selected output fiber.

BRIEF DESCRIPTION OF THE DRAWINGS

FIGS. 1A–1B show top and side views of an optical switch of the present invention.

FIG. 2A shows a perspective view of an adjustable phase hologram device of the present invention.

FIG. 2B shows a perspective view of a two-dimensional adjustable phase hologram device of the present invention.

FIGS. 3A–3D show operation of the optical switch.

FIGS. 6A–6B show schematic and side views of one embodiment of a N×N optical switch of the present invention.

FIGS. 7A–7C show another embodiment of a N×N optical switch of the present invention.

DETAILED DESCRIPTION OF THE INVENTION

Figure 1B:
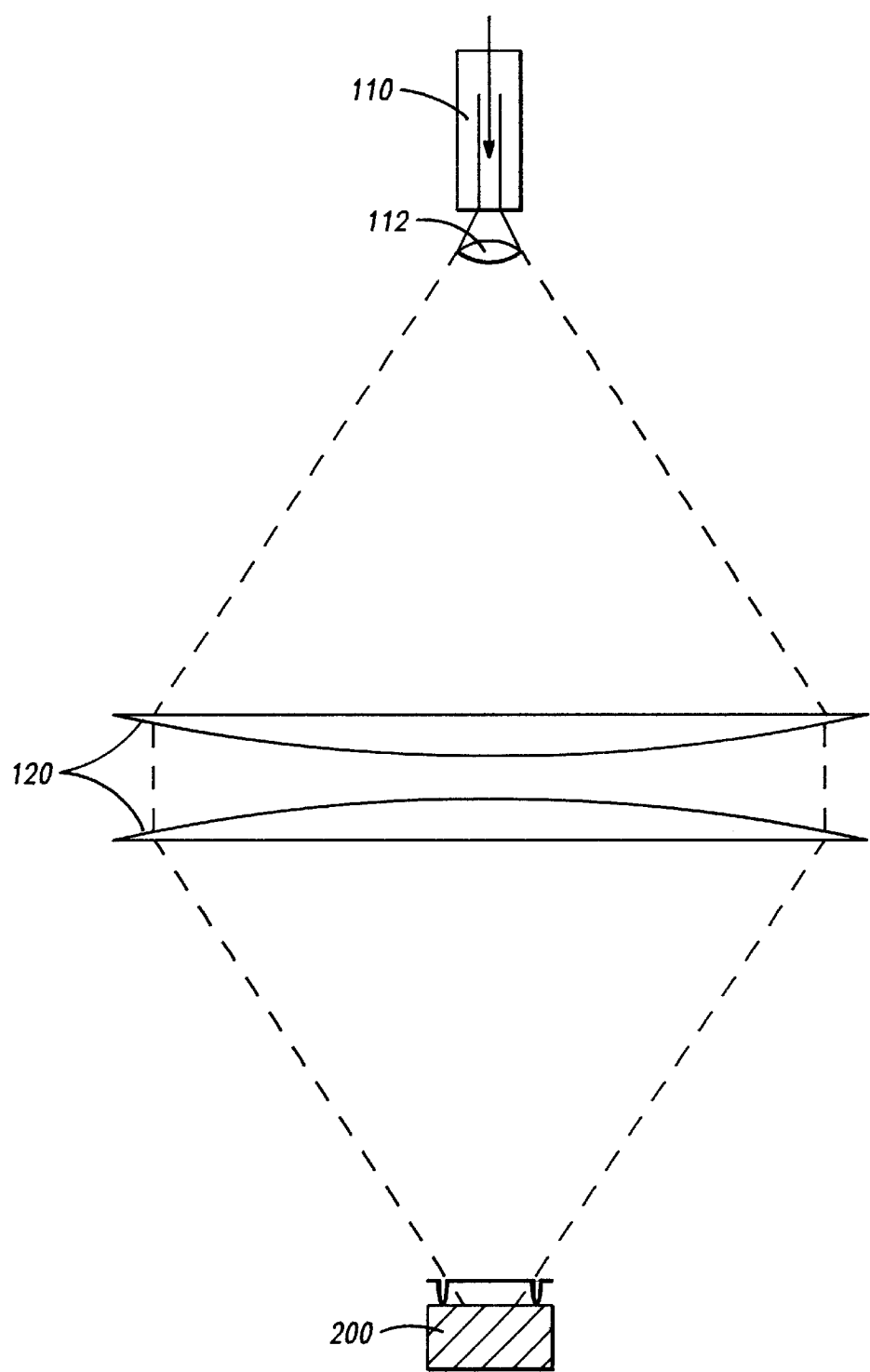

FIGS. 1A and 1B show top and side views of one emobidment of an optical switch 100 of the present invention. A light beam carrying an optical signal is carried into optical switch 100 by an input fiber 110. Input fiber 110 terminates and the light beam passes through a microlens array 112 onto a lens 120. Lens 120 collimates the light beam onto an adjustable phase hologram device 200. Adjustable phase hologram device 200 is capable of reflecting the light beam and directing the light beam back through lens 120, microlens array 112, and to at least one of a plurality of output fibers 130.

Input fibers 110 may be a fiber optic ribbon cable. Input fiber 110 may carry a plurality of signals associated with a plurality of wavelengths, such as in a WDM format. Lens 120 may be a spherical lens in series with a cylindrical lens. For this configuration, the spherical lens collimates the light beam, while the cylindrical lens images the light beam on adjustable phase hologram device 200. Lens 120 may also be an anamorphic lens, a multielement lens, or any other suitable lens or lenses. Lens 120 directs the light beam so that its rays are incident at a desired angle to the surface of adjustable phase hologram device 200. Lens 120 is placed focal length f away from microlens array 112. Adjustable phase hologram device 200 includes a micromachined reflective surface which can be controlled and adjusted to produce a wide range of phase profiles. These phase profiles reflect the light beam in a controlled fashion to reach a selected output fiber 130. Adjustable phase hologram device 200 is placed focal length f away from lens 120 and microlens array 112 image the reflected and diffracted light beams from adjustable phase hologram device 200 onto at least one selected output fiber 130.

FIG. 2A shows a perspective view of adjustable phase hologram device 200. Adjustable phase hologram device 200 includes a plurality of ribbons 210 suspended above a substrate 220. Ribbons 210 may be supported by one or more supports 214 at both ends, or by one or more supports 214 at only one end in a cantilever fashion. Ribbons 210 may also be supported by blocks. In this fashion, there is gap between ribbons 210 and substrate 220, which may be a vacuum or filled with air or some other gas. Ribbons 210 are coated with a reflective layer 212 to enhance their reflectivity.

Ribbons 210 may be fabricated of silicon nitride, polysilicon, silicon carbide, aluminum alloys, or any other material having suitable tensile strength and durability. Substrate 220 may be a doped silicon substrate. Substrate 220 may also be an insulator coated with a conductive layer such as tungsten, titanium nitride, or aluminum. Reflective layer 212 may be of gold, silver, aluminum, copper, or any other suitable reflective material. For fiber optic transmission, which uses infrared light with wavelengths of approximately 1.55 μm, gold is especially well-suited for use as reflective layer 212.

A programmable or controllable voltage source is connected to reflective layer 212 and substrate 220. To address a particular ribbon 210, a potential difference is applied between reflective layer 212 and substrate 220. This potential difference creates an electrostatic attraction, which deflects the ribbon 210 toward the substrate 220. Independent and precise control of the vertical displacement of each ribbon 210 can be achieved by balancing this electrostatic attraction against the restoring force of ribbon 210. When a higher drive voltage is applied, ribbon 210 achieves equilibrium at a point of greater deflection.

Because the electrostatic attraction is inversely proportional to the square of the distance between reflective layer 212 and substrate 220, and the distances involved are quite small, very strong attractive forces and accelerations may be achieved. These are counter-balanced by having a very strong tensile restoring force designed into ribbon 210. The net result is a robust, highly uniform, and repeatable mechanical system. The combination of light mass, small excursion, and large attractive and restoring forces are capable of producing switching speeds as low as 20 nsec.

The dimensions of ribbon 210 and gap height are selected according to the wavelengths of the light beams to be routed. For example, fiber optic transmission uses infrared light with wavelengths of approximately 1.55 μm. For this application, the gap height is selected to be sufficient to produce a maximum ribbon displacement of half a wavelength or greater, or approximately 0.75 μm or greater. Approximately 1 μm of ribbon displacement may be achieved by using ribbons 210 which are 9 μm wide with a space of 1 μm between ribbons, 500 μm long, 100 nm thick, and having a gap height of 3 μm. Ribbons 210 of this size exhibit a continuous ribbon displacement versus voltage behavior for ribbon displacement up to one-third of the gap height, beyond which ribbon 210 will "snap" down.

Ribbons 210 may also include a comb structure which intermeshes with a corresponding comb structure on substrate 220. Reflective layer 212 is polished using a chemical-mechanical polishing process. This comb drive allows for greater displacements of ribbons 210, but at the cost of slower response times.

FIG. 2B shows a two-dimensional adjustable phase hologram device 200'. Two-dimensional adjustable phase hologram device 200' uses two or more rows of ribbons 210, and is capable of producing two-dimensional phase profiles and diffraction patterns.

Figure 2C:
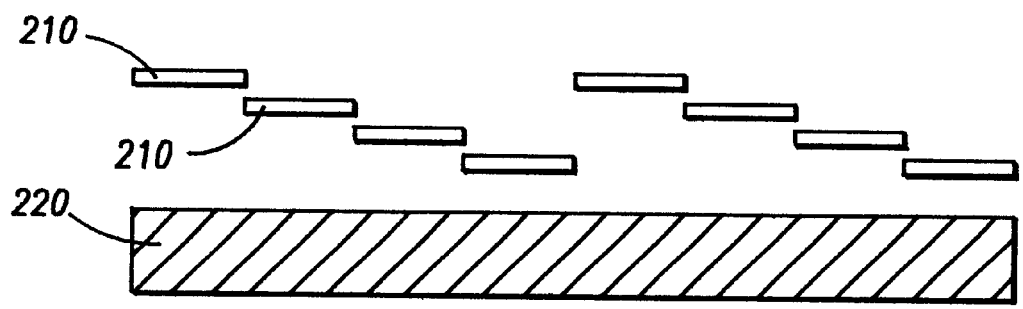
FIG. 2C shows a side view of a section of the adjustable phase hologram device.
Figure 2D:
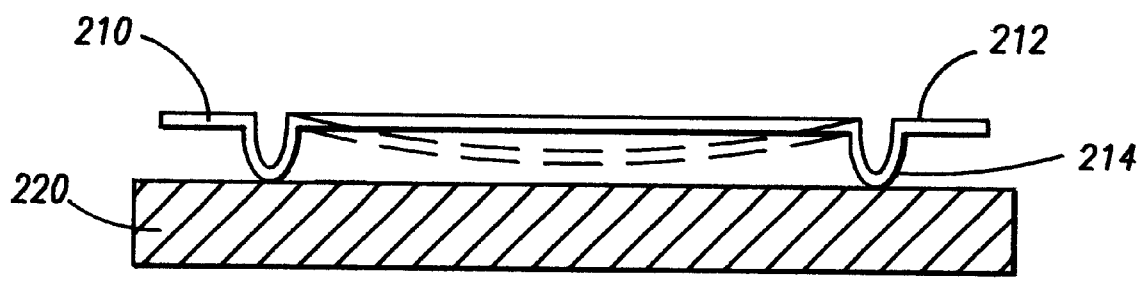
FIG. 2D shows a side view of a single ribbon of the adjustable phase hologram device.

FIG. 2C shows a side view of a section of adjustable phase hologram device 200. Control of the potential difference applied to each ribbon 210 and substrate 220 controls the amount of displacement of each ribbon 210. In this way, adjustable phase hologram device 200 is able to emulate a continuous mirror tilted by using discrete reflective segments. FIG. 2D shows a side view of a single ribbon of adjustable phase hologram device 200. Displacement is greatest in the center region of ribbon 210, and ideally it is the region of adjustable phase hologram 200 defined by the center regions of ribbons 210 where the light beam from input fiber 110 is imaged.

FIGS. 3A–3D show the operation of optical switch 100. FIG. 3A shows a light beam from input fiber 110 passing through a microlens array 112 onto lens 120, which in turn collimates the light beam onto adjustable phase hologram device 200. FIG. 3B shows ribbons 210 displaced in varying amounts to emulate a tilted mirror with a normal angle $\Theta_1$, giving an angle between the incident beam and the reflected beam of $2\Theta_1$. FIG. 3C shows ribbons 210 displaced in varying amounts to emulate a tilted mirror with a normal angle $\Theta_2$. The same number of ribbons 210 or a varying number of ribbons 210 may be used to form each emulated "mirror" or blaze. Using at least four ribbons per blaze has been found to produce satisfactory results, although fewer ribbons may be used. FIG. 3D shows the rays of the light beam incident upon ribbons 210 reflected back through lens 120, microlens array 112, and to an output fiber 130.

To achieve an arbitrary phase profile, each ribbon only needs to have a displacement range between zero and $\lambda/2$. This allows for other applications such as splitting light from input fiber 110 equally into more than one output fiber 130. In this way, adjustable phase hologram device 200 is controlled to produce a diffraction pattern which functions as a broadcast mode.

Input fibers 110 and output fibers 130 may be formed as a ribbon or linear array using micromachining techniques. For example, micromachining V-shaped grooves in a substrate can provide a very precise method of positioning output fibers 130 exactly where the reflected light beam will be imaged inside optical switch 100. The optical fibers may be held in place using laser welding or an ultraviolet-cured epoxy.

Adjustable phase hologram device 200 has many other applications other than optical switching. Optical data storage formats such as magneto-optical and CD drives may utilize adjustable phase hologram device 200 to control a reading or writing laser beam, resulting in faster seek and access times. Bar code scanners may also use adjustable phase hologram device 200.

The workability of using multiple discrete reflective surfaces to emulate a continuous mirror is described below. Essentially, the Fourier transform of the surface of adjustable phase hologram device 200 is shown below to be able to produce a range of desired diffraction patterns.

Suppose that the width of each ribbon is w, the center-to-center distance between ribbons is $\Lambda$, and light coming out of the fiber is a. The lens behaves as a Fourier transform lens and adjustable phase hologram 200 sees the Fourier transform $\Im$ of a. Let the complex reflectance of the device be d. The light reflecting off the device is then given by $$\Im\{a\} \cdot d$$

Going back to the fiber plane from the device is yet another Fourier transform, i.e.

$$\Im\{\Im\{a\} \cdot d\} = \Im\{\Im\{a\}\} * \Im\{d\} = a * \Im\{d\}$$

where * is the convolution operator. The output is simply the fiber mode convoluted with the Fourier transform of the device reflectance. So now we will evaluate $\Im\{d\}$. The complex reflectance of the device can be written as $$d(x) = \left[\sum_{m=-\infty}^{+\infty} \delta(x - m\Lambda) \cdot e^{j2\pi\alpha x}\right] * \mathrm{rect}(x/w) \text{ where}$$

$$\mathrm{rect}(x) = \begin{cases} 1 & \text{for } |x| < 1/2 \\ 0 & \text{for } |x| > 1/2 \end{cases}$$

The above is simply one ribbon convolved with an infinite series of delta functions having a linear phase variation of $2\pi\alpha$ per unit x. The Fourier transform is given as $$D(s) = \left[\sum_{m=-\infty}^{+\infty} \delta\left(s - \frac{m}{\Lambda} - \alpha\right)\right] \cdot \mathrm{sinc}(ws) \cdot \frac{w}{\Lambda} \text{ where}$$

$$\mathrm{sinc}(s) = \frac{\sin(\pi s)}{\pi s}$$

where s is spatial frequency. The result is very simple. It is the m=0 beam which is of interest since its position in the output plane changes linearly with $\alpha$. The device is designed such that the higher harmonics are outside the band of interest and do not affect the operation of the switch.

Figure 4A:
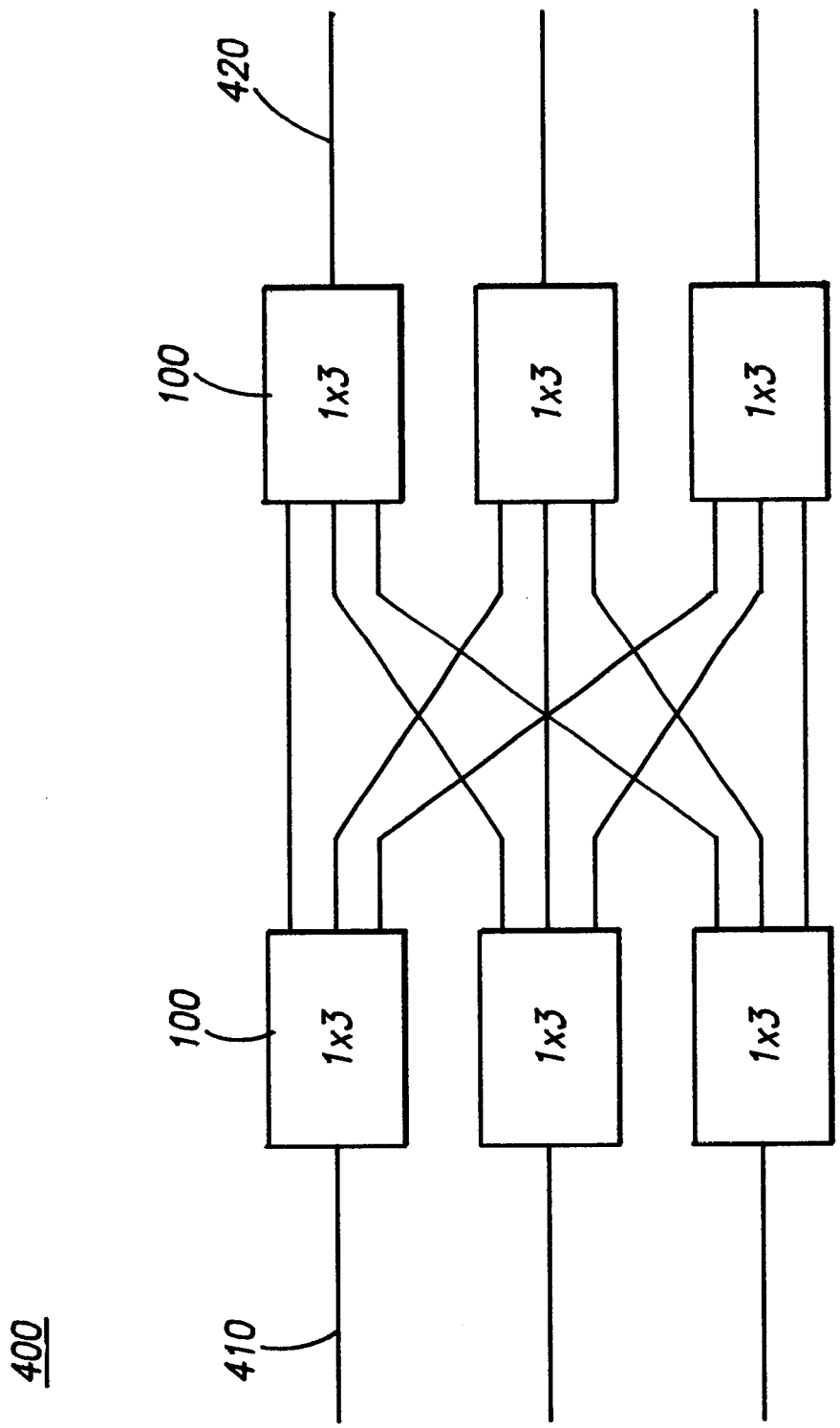
FIG. 4A shows a 3×3 cross-connect constructed from a plurality of optical switches of the present invention.

FIG. 4A shows a 3×3 cross-connect 400 for three optical fibers. Each of the input fibers 410 is fed into its own optical switch 100. Each optical switch 100 is connected to a second set of optical switches 100 utilized in a reverse mode, which are in turn connected to output fibers 420. Some or all of the optical switches 100 may be manufactured on the same substrate 220.

The basic building block of cross-connect 400 is optical switch 100, which is shown in FIG. 4A as an 1×3 switch. A 3×3 cross-connect is built using six 1×3 switches. This structure can be generalized to a N×N cross-connect, which requires 2N 1×N switches. For example, a 1000×1000 cross-connect requires two thousand 1×1000 optical switches of the present invention.

Other optical switches, such as micromirror devices, are limited to 2×2 switches because they are only capable of resolving two spots. The limited number of resolvable spots for these switches means that a N×N cross-connect would require $N^2$ 2×2 switches. Thus, a 1000×1000 cross-connect would require one million of these 2×2 switches.

Figure 4B:
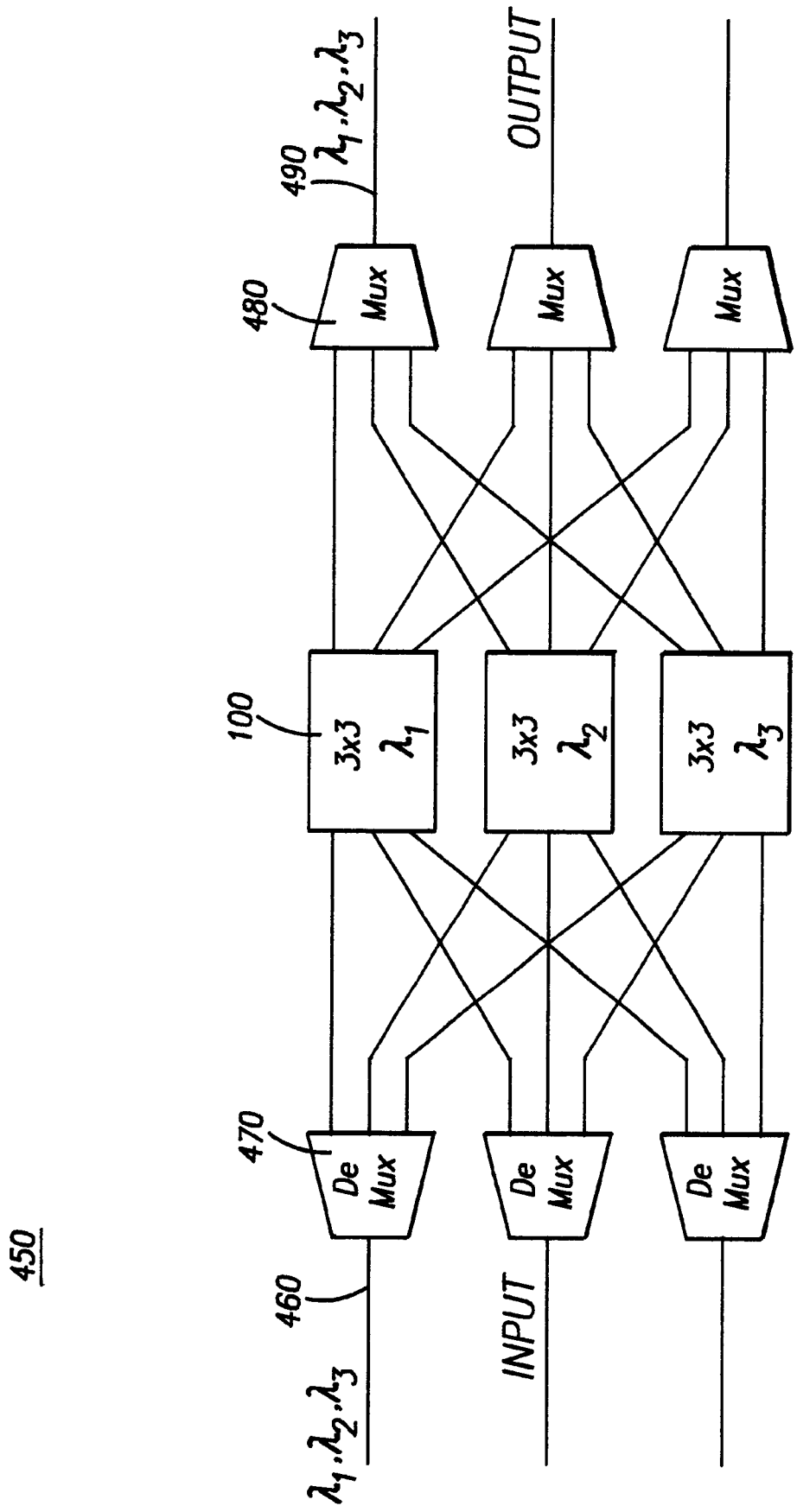
FIG. 4B shows a 3×3 wavelength-space cross-connect constructed from a plurality of optical switches of the present invention.

FIG. 4B shows a 3×3 wavelength-space cross-connect 450 for three optical fibers carrying three different wavelengths. Each of the input fibers 460 is first fed into its own wavelength demultiplexer 470. Wavelength demultiplexer 470 separates the input signal carried by input fibers 460 into the different wavelengths. Wavelength demultiplexer 470 may be a diffraction grating or a waveguide-grating router. The wavelength-separated input signals are then fed into three 3×3 cross-connects 400. Each of the three 3×3 cross-connects 400 is responsible for switching one of the three wavelengths. After cross-connects 400 route the wavelength-separated input signals, wavelength multiplexers 480 combine the signals and are connected to output fibers 490.

Figure 5A:
FIGS. 5A–5E show a process for fabricating the adjustable phase hologram device.
Figure 5B:
Figure 5C:
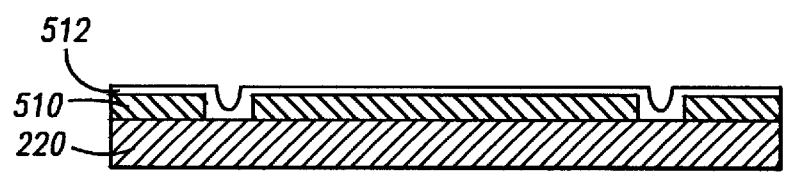
Figure 5D:
Figure 5E:

FIGS. 5A–5E show a process for fabricating an adjustable phase hologram device 200. This process may be carried out at a CMOS fabrication facility using readily available materials and equipment. FIG. 5A shows the depositing of a sacrificial layer 510 having a certain thickness on substrate 220. Sacrificial layer 510 may be PSG (phospho-silicate glass) or some other oxide, which is removed using hydrofluoric acid. Sacrificial layer 510 may also be a polymer, which is removed using an oxygen plasma etch. Sacrificial layer 510 may also be a polysilicon or amorphous silicon, which may be removed using a xenon difluoride etch, a dry release process. Substrate 220 may be electrically conducting such as doped silicon, or an insulator such as glass, in which case it would include a conductive layer. FIG. 5B shows the etching of sacrificial layer 510. The etching pattern may be holes for making supports 214 or other structures for supporting ribbons 210. FIG. 5C shows the depositing of a ribbon material 512 to create ribbons 210. Ribbon material 512 may be silicon nitride, polysilicon, silicon carbide, aluminum alloys, or any other material having suitable tensile strength and durability. After ribbon material 512 is deposited, it is etched to create the individual ribbons 210. FIG. 5D shows the removal of sacrificial layer 510. The removal process is designed to completely undercut and remove sacrificial layer material under ribbons 210. The thickness of sacrificial layer 510 thus determines the gap height between ribbon 210 and substrate 220. FIG. 5E shows the evaporating of a reflective material 514 to create reflective layers 212. Reflective material 514 may be gold, silver, aluminum, copper, or any other suitable reflective material. The evaporating of reflective material 514 may also take place immediately after the depositing of ribbon material 512 and etched along with ribbon material 512 to form the individual ribbons 210. The fabrication process may also include integrating custom driver circuits with adjustable phase hologram device 200. The critical tolerances for adjustable phase hologram 200 is limited only by photolithographic technique.

Figure 6A:
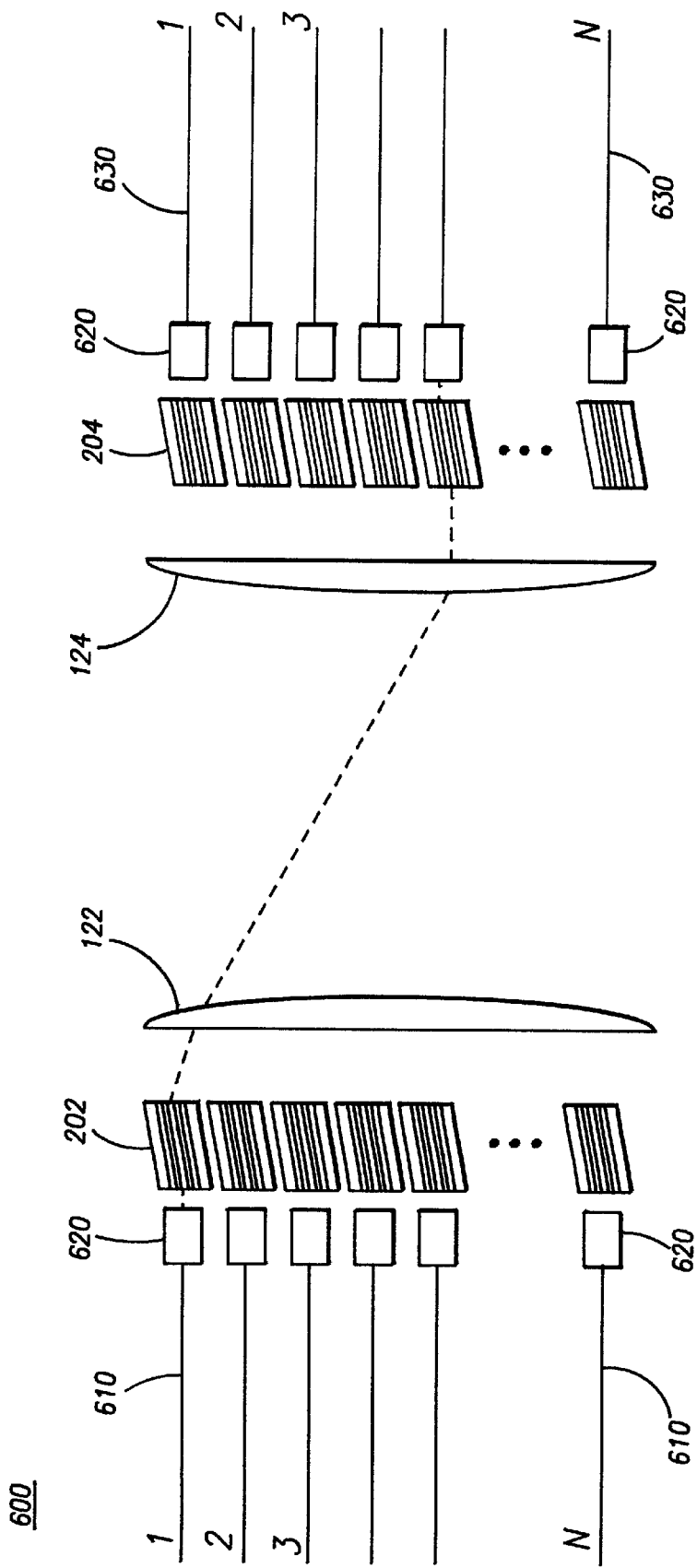

FIG. 6A shows a schematic view of another embodiment of an N×N optical switch 600 of the present invention. Optical switch 600 includes input fibers 610 which carry light beams carrying optical signals. Each input fiber 610 terminates at a GRIN (graded index) lens 620. Each GRIN lens 620 collimates the light beam onto an array of input adjustable phase hologram devices 202. Input adjustable phase hologram devices 202 are capable of reflecting the light beams and directing the light beams through free space to an array of output adjustable phase hologram devices 204. In this fashion, the light beams are steered by input adjustable phase hologram devices 202 to the desired output adjustable phase hologram device 204 and its corresponding output fiber 630.

Input adjustable phase hologram devices 202 may first direct the light beams through an input lens 122 and output lens 124. Input lens 122 directs the light beams through free space to an output lens 124. Input lens 122 and/or output lens 124 may be a single lens of focal length equal to the distance between the input and output lenses 122 and 124. Input lens 122 and output lens 124 may be used to keep the light beams nominally pointing in the center so that both positive and negative deflections created by input adjustable phase hologram devices 202 may be used. Output lens 124 directs the light beams onto adjustable phase hologram devices 204. Output adjustable phase hologram devices 204 are capable of reflecting the light beams to their corresponding output fibers 630.

FIG. 6B shows a side view of one embodiment of input adjustable phase hologram device 202. A light beam bounces off a reflector 640, off of the reflecting surface 642 of input adjustable phase hologram device 202, and off of reflector 640 again, the direction of the light beam now changed in one axis. The device shown in FIG. 6B includes N devices extending into the page and capable of accommodating N light beams.

FIG. 7A shows yet another embodiment of an N×N optical switch 700 of the present invention. Optical switch 700 is a two-dimensional N×N switch which arranges the collimated input fibers 710 in a two dimensional array. Input adjustable phase hologram devices 202 and output adjustable phase hologram devices 204 are also arranged in a two dimensional array. Spreading input fibers 710 and output fibers 730 across a plane allows packing more fiber/GRIN ports than in a one dimensional configuration. This approach makes the mechanical design easier. Moreover, because the fibers can be spread out in two dimensions, smaller angular deflection can be used or fewer and larger ribbons can be used to improve the yield of the fabrication process. But most importantly, lower resolution beam steering devices can be used because only n resolvable angles are required where $n^2=N$. A long focal length lens may be used on both the input and output sides for reasons similar to those discussed above.

Figure 7B:
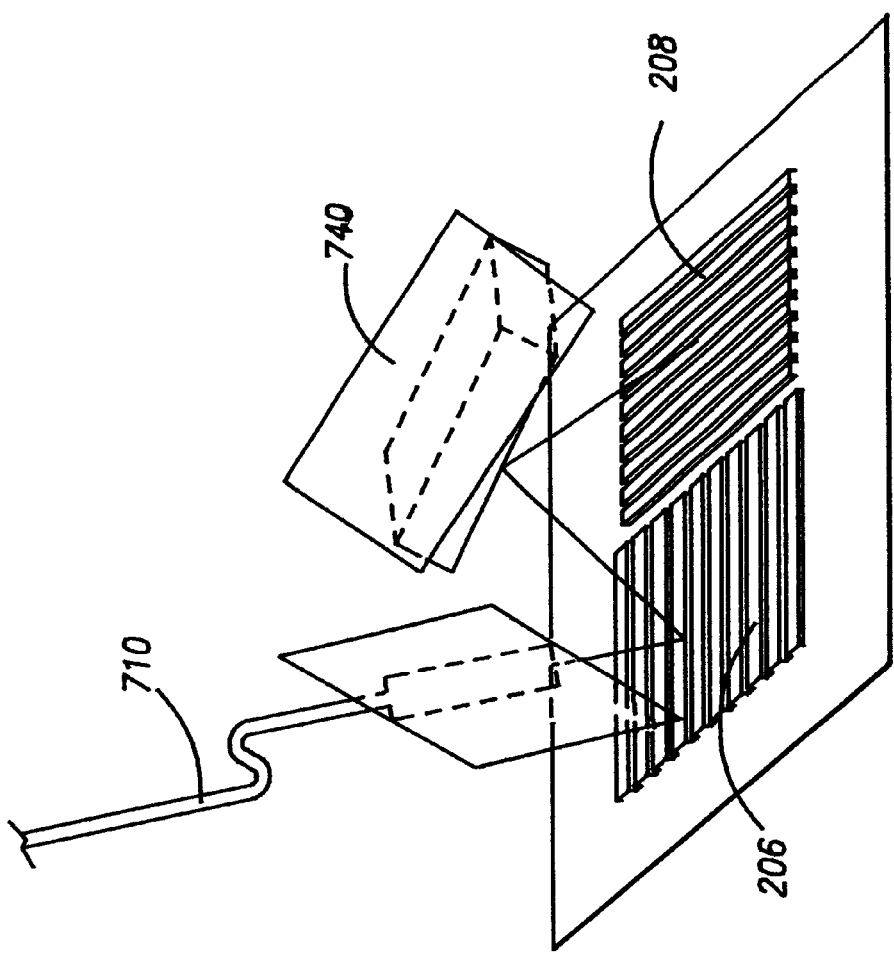

FIG. 7B shows a perspective view of the path of the light beam as it is reflected off an x-axis adjustable phase hologram device 206, off a reflector 740, and off an y-axis adjustable phase hologram device 208, the direction of the light beam now changed in both the x and y axes. FIG. 7C shows a side view of another embodiment of an adjustable phase hologram device 200 with an x-axis adjustable phase hologram device 206 and a y-axis adjustable phase hologram device 208. The adjustable phase hologram devices are formed on a substrate 207, which may be formed on a PCB 209. The light beam is reflected off a reflector 740, off of x-axis adjustable phase hologram device 206, off of reflector 740 again, off of y-axis adjustable phase hologram device 208, and off a third time off of reflector 740. The array shown in FIG. 7C is made up of n devices which extend into the page, and n rows stacked one on top of another to form a two-dimensional array capable of accommodating nxn light beams.

One difficulty with using a lightsteering device made from a large number of ribbons, each of which must be electronically addressed, is that each ribbon must then have its own voltage source and that voltage must be independently set. A system with many voltage sources will be less reliable and more complex than a system with fewer. Digital selection is a technique in which it is possible to use only $2^n$ voltage sources to produce $2^{n-1}+1$ addressable beams which are evenly spaced in angle regardless of the size of the array or the number of ribbons.

Consider an array with a very large number of ribbons with center to center spacing of $\Lambda$. Suppose the voltages are independently controlled and hence the deflections of the first $2^n$ ribbons (#1 through #$2^n$). In addition, the rest of the ribbons are electrically connected in groups of $2^n$, to the same set of voltages in the following fashion: ribbon 1 to ribbon $2^n+1$ and $2^{n+1}+1$ and $2^{n+2}+1$, . . . and in general ribbon p to ribbons $2^n+p$ and $2^{n+1}+p$ and $2^{n+2}+p$ so on. A linear phase ramp can be created across the array to emulate a tilting mirror or lightsteering device. Suppose ribbon 1 is not deflected and corresponds to zero phase. It follows then that ribbon $2^n+1$ is also not deflected and corresponds to say $p2\pi$ phase where p is a positive or negative integer. Voltages are applied on the first $2^n$ ribbons to create a linear phase going from zero to $p2\pi$ across $\Lambda 2^n$. This linear phase is carried across the whole array and corresponds to a light steering angle of, $$\theta(p) = \frac{\lambda}{\Lambda} \cdot \frac{p}{2^n}, \text{ where } p = 0, \pm 1, \pm 2, \ldots, \pm p_{max}$$

Note the steering angles are equally spaced. From previous analysis, to maintain greater than 80% optical efficiency the maximum phase ramp is $2\pi$ per $4\Lambda$. This implies $P_{max}=2^n/4$, therefore the number of steering angles is $2^{n-1}+1$. It should be pointed out that in practice the maximum deflection on any ribbon is $\lambda/2$ corresponding to $2\pi$ phase shift and larger phases are obtained by doing a phase wraparound. For the purposes of these calculations 4 may be used as the fundamental number of ribbons for defining the slope of the deflector. This should not be taken as a limitation or a requirement.

The foregoing description of the invention has been presented for purposes of illustration and description. It is not intended to be exhaustive or to limit the invention to the precise forms disclosed. Obviously, many modifications and variations will be apparent to practitioners skilled in this art.

What is claimed is:

1. A micromechanical light steering device, comprising:
a substrate;
a plurality of ribbons suspended above the substrate,
wherein there is at least one support between each ribbon and the substrate; and
each ribbon having a reflecting surface for reflecting a light beam incident upon the reflecting surface, the ribbons being arranged substantially parallel to each other, the ribbons controllably deflecting toward the substrate when a voltage difference is applied between the substrate and the ribbons, the reflecting surfaces capable of imparting an arbitrary phase profile on the light beam, wherein the arbitrary phase profile emulates a tilting mirror.

2. A micromechanical light steering, comprising:
a substrate;
a plurality of ribbons suspended above the substrate,
wherein there is at least one support between each ribbon and the substrate; and
each ribbon having a reflecting surface for reflecting a light beam incident upon the reflecting surface, the ribbons being arranged substantially parallel to each other, the ribbons controllably deflecting toward the substrate when a voltage difference is applied between the substrate and the ribbons, the reflecting surfaces capable of imparting an arbitrary phase profile on the light beam wherein the arbitrary phase profile is a linear ramp.

3. A micromechanical light steering device according to claim 1, wherein the arbitrary phase profile reflects the light beam into a plurality of output beams of equal intensity.

4. A micromechanical light steering device according to claim 1, wherein the substrate is silicon.

5. A micromechanical light steering device according to claim 1, wherein the substrate is coated with a conductive layer.

6. A micromechanical light steering device according to claim 5, wherein the conductive layer is tungsten, titanium nitride, or aluminum.

7. A micromechanical light steering device according to claim 1, wherein the ribbons are suspended 2–6 $\mu$m above the substrate.

8. A micromechanical light steering device according to claim 1, wherein the ribbons are made of silicon nitride, polysilicon, silicon carbide, or an aluminum alloy.

9. A micromechanical light steering device according to claim 1, wherein the reflecting surface includes a reflective coating.

10. A micromechanical light steering device according to claim 9, wherein the reflective coating is gold, silver, aluminum, or copper.

11. A micromechanical light steering device according to claim 1, wherein the ribbons each have a length and a width, the length being greater than the width.

12. A micromechanical light steering device according to claim 11, wherein the ribbons do not all have the same width.

13. A micromechanical light steering device according to claim 1, wherein the ribbons have a width of 1–100 $\mu$m.

14. A micromechanical light steering device according to claim 1, wherein the ribbons are spaced 0.1–5 $\mu$m apart from each other.

15. A micromechanical light steering device according to claim 1, wherein the ribbons have a length of 25–3000 $\mu$m.

16. A micromechanical light steering device according to claim 1, wherein the ribbons have a thickness of 0.1–2 $\mu$m.

17. A micromechanical light steering device according to claim 1, wherein the light beam carries an optical signal.

18. A micromechanical light steering device according to claim 1, wherein the light beam has a wavelength of 1.5–1.65 $\mu$m.

19. A micromechanical light steering device according to claim 1, wherein the ribbons are capable of deflecting a distance equal to at least half a wavelength of the light beam.

20. A two-dimensional micromechanical light steering device, comprising:
a first micromechanical light steering for steering the light beam in one dimension; and
a second micromechanical light steering device optically coupled to the first light steering device, the second light steering device for steering the light beam in a second dimension and
wherein each of the first and second micromechanical light steering devices including,
a substrate;
a plurality of ribbons suspended above the substrate,
wherein there is at least one support between each ribbon and the substrate, and
each ribbon having a reflecting surface for reflecting a light beam incident upon the reflecting surface, the ribbons being arranged substantially parallel to each other, the ribbons controllably deflecting toward the substrate when a voltage difference is applied between the substrate and the ribbons, the reflecting surfaces capable of imparting an arbitrary phase profile on the light beam.

21. A micromechanical optical switch, comprising:
a micromechanical light steering device including,
a substrate;
a plurality of ribbons suspended above the substrate,
wherein there is at least one support between each ribbon and the substrate, and
each ribbon having a reflecting surface for reflecting a light beam incident upon the reflecting surface, the ribbons being arranged substantially parallel to each other, the ribbons controllably deflecting toward the substrate when a voltage difference is applied between the substrate and the ribbons, the reflecting surfaces capable of imparting an arbitrary phase profile on the light beam;
an input fiber;
a plurality of output fibers;
a lens for collimating a light beam carried by the input fiber onto the reflecting surface of the micromechanical light steering device, the lens focusing the light beam reflected from the reflecting surface onto at least one of the plurality of output fibers.

22. A micromechanical optical switch according to claim 21, wherein the output fibers are arranged in a two-dimensional array.

23. A micromechanical optical switch, comprising:
a plurality of input fibers;
a plurality of output fibers;
a plurality of input micromechanical light steering devices, each input fiber being optically coupled to an input micromechanical light steering device;
a plurality of output micromechanical light steering devices, each output fiber being optically coupled to an output micromechanical light steering device, the input micromechanical light steering devices being capable of steering a light beam from the input fibers to at least one particular output micromechanical light steering device and the output micromechanical light steering devices being capable of steering the light beam from the input micromechanical light steering devices onto the corresponding output fiber and wherein each of the input and output micromechanical light steering devices including,
 a substrate;
 a plurality of ribbons suspended above the substrate, wherein there is at least one support between each ribbon and the substrate, and
 each ribbon having a reflecting surface for reflecting a light beam incident upon the reflecting surface, the ribbons being arranged substantially parallel to each other, the ribbons controllably deflecting toward the substrate when a voltage difference is applied between the substrate and the ribbons, the reflecting surfaces capable of imparting an arbitrary phase profile on the light beam.

24. A micromechanical optical switch according to claim 22, further comprising at least one focusing lens optically coupled between the input micromechanical light steering devices and the output micromechanical light steering devices.

25. A micromechanical optical switch according to claim 22, wherein the input fibers and input micromechanical light steering devices are arrange in a two-dimensional array.

26. A micromechanical optical switch according to claim 22, wherein the output fibers and output micromechanical light steering devices are arranged in a two-dimensional array.

27. A method for controlling ribbon deflection in a micromechanical light steering device, comprising:
 grouping ribbons evenly spaced apart into sets of ribbons; and applying sets of voltages to each set of ribbons to create a linear phase profile across the light steering device, wherein the linear phase profile changes in discrete and equal steps according to the set of voltages applied;
 wherein the micromechanical light steering device includes,
 a substrate,
 a plurality of ribbons suspended above the substrate, wherein there is at least one support between each ribbon and the substrate, and
 each ribbon having a reflecting surface for reflecting a light beam incident upon the reflecting surface, the ribbons being arranged substantially parallel to each other, the ribbons controllably deflecting toward the substrate when a voltage difference is applied between the substrate and the ribbons, the reflecting surfaces capable of imparting an arbitrary phase profile on the light beam.

* * * * *